(12) United States Patent
Jung et al.

(10) Patent No.: US 8,349,452 B2
(45) Date of Patent: Jan. 8, 2013

(54) MICROCAPSULES, THEIR PREPARATION AND USE

(75) Inventors: Marc Rudolf Jung, Worms (DE);
Juergen Reichert, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/918,728

(22) PCT Filed: Feb. 27, 2009

(86) PCT No.: PCT/EP2009/052337
§ 371 (c)(1),
(2), (4) Date: Aug. 20, 2010

(87) PCT Pub. No.: WO2009/112378
PCT Pub. Date: Sep. 17, 2009

(65) Prior Publication Data
US 2010/0327216 A1 Dec. 30, 2010

(30) Foreign Application Priority Data
Mar. 3, 2008 (EP) .................................. 08152194

(51) Int. Cl.
*B32B 5/16* (2006.01)
*B32B 9/00* (2006.01)
*B32B 15/02* (2006.01)
*B32B 17/02* (2006.01)
*B32B 19/00* (2006.01)
*B01J 13/02* (2006.01)
*B05D 7/00* (2006.01)

(52) U.S. Cl. ................. 428/402.24; 427/213.3; 264/4.1; 264/4.33; 264/4.7

(58) Field of Classification Search ..... 428/402–402.24; 427/213.3–213.36; 264/4–4.7
See application file for complete search history.

(56) References Cited

U.S. PATENT DOCUMENTS

| | | | |
|---|---|---|---|
| 3,880,869 | A | 4/1975 | Scheuermann et al. |
| 3,919,110 | A | 11/1975 | Vassiliades et al. |
| 4,379,934 | A | 4/1983 | Graser et al. |
| 4,446,324 | A | 5/1984 | Graser |
| 4,618,694 | A | 10/1986 | Iden et al. |
| 5,456,852 | A | 10/1995 | Isiguro |
| 5,585,051 | A | 12/1996 | Hosie et al. |
| 5,596,051 | A * | 1/1997 | Jahns et al. ............... 526/73 |
| 5,710,197 | A | 1/1998 | Fischer et al. |
| 6,200,681 | B1 | 3/2001 | Jahns et al. |
| 2002/0159957 | A1 | 10/2002 | Lages et al. |
| 2003/0118822 | A1 | 6/2003 | Jahns et al. |
| 2004/0136933 | A1 | 7/2004 | Mistry et al. |
| 2004/0234738 | A1 | 11/2004 | Jahns et al. |
| 2007/0202185 | A1 | 8/2007 | Amundson et al. |
| 2009/0256107 | A1 | 10/2009 | Hentze et al. |
| 2010/0068525 | A1 | 3/2010 | Jung et al. |

FOREIGN PATENT DOCUMENTS

| | | |
|---|---|---|
| DE | 24 51 782 | 5/1976 |
| DE | 44 19 518 | 12/1995 |
| DE | 44 35 422 | 4/1996 |
| DE | 44 35 423 | 4/1996 |
| EP | 0 623 662 | 11/1994 |
| EP | 0 692 517 | 1/1996 |
| EP | 0 816 406 | 1/1998 |
| EP | 0 858 478 | 8/1998 |
| EP | 1 321 182 | 6/2003 |
| EP | 1 882 610 | 1/2008 |
| WO | 99 24525 | 5/1999 |
| WO | 99 40123 | 8/1999 |
| WO | 02 064246 | 8/2002 |
| WO | 02 090445 | 11/2002 |
| WO | 03 016650 | 2/2003 |
| WO | 2005 012378 | 2/2005 |

OTHER PUBLICATIONS

U.S. Appl. No. 12/744,596, filed May 25, 2010, Jung.
U.S. Appl. No. 12/865,756, Levy, et al.
U.S. Appl. No. 13/376,226, filed Dec. 5, 2011, Jung, et al.
U.S. Appl. No. 13/383,334, filed Jan. 10, 2012, Jung, et al.
U.S. Appl. No. 13/499,502, filed Mar. 30, 2012, Willax, et al.

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

Microcapsules, comprising
(A) in the range from 50 to 95 parts by weight, lipophilic core material which has a solid/liquid phase transition in the temperature range from −20 to 120° C.,
(B) in the range from 4 to 50 parts by weight, capsule wall, and
(C) in the range from 0.01 to 10 parts by weight, at least one colored or color-imparting substance selected from oil-soluble dyes and oil-soluble brighteners,
where data in parts by weight are based on the total weight of the microcapsules in question.

13 Claims, No Drawings

MICROCAPSULES, THEIR PREPARATION AND USE

The present invention relates to microcapsules, comprising
(A) in the range from 50 to 95 parts by weight, lipophilic core material which has a solid/liquid phase transition in the temperature range from −20 to 120° C.,
(B) in the range from 4 to 50 parts by weight, capsule wall, and
(C) in the range from 0.01 to 10 parts by weight, at least one colored or color-imparting substance selected from oil-soluble dyes and oil-soluble brighteners,
where data in parts by weight are based on the total weight of the microcapsules in question.

Furthermore, the present invention relates to a method of producing the microcapsules according to the invention. Furthermore, the present invention relates to the use of the microcapsules according to the invention for the finishing of substrates. Finally, the present invention relates to substrates which have been finished with the microcapsules according to the invention.

Microencapsulated latent heat storage materials, which can also be referred to as "phase change materials" or PCM for short, are being used more and more widely, for example, in building materials or in textiles. The effect of the microencapsulated latent heat storage materials consists essentially in that they have in the core a material which has a phase transition, preferably a solid/liquid phase transition, in a temperature range from −20 to 120° C. At temperatures above the temperature of the phase transition, the phase transition energy (phase transition enthalpy) is stored. If the ambient temperature, for example, in the case of a building the external temperature or—as a result of this—the internal temperature, drops below the temperature of the phase transition, then the phase transition takes place and the phase transition energy (phase transition enthalpy) is released and can be utilized, for example, for heating the building or—in the case of items of clothing—for warming the body. This process is reversible and can be repeated as often as desired.

In order to equip colored substrates with microencapsulated latent heat storage materials, it is generally proposed to add a colorant, in particular a pigment, to the finishing. However, it is observed that the fastnesses are not satisfactory in many cases. It is therefore observed that colored materials which have been finished with microencapsulated latent heat storage materials soon have a less brilliant coloration.

It was therefore the object to provide a method through which substrates can be finished which utilize the properties of a latent heat storage material and which at the same time have a brilliant coloration with excellent fastness. It was furthermore the object to provide substances which are suitable for finishing substrates which utilize the properties of a latent heat storage material and which at the same time have a brilliant coloration with excellent fastness.

Accordingly, the microcapsules defined at the start have been found.

Microcapsules according to the invention comprise
(A) in the range from 50 to 95 parts by weight, lipophilic core material which has a solid/liquid phase transition in the temperature range from −20 to 120° C.,
(B) a capsule wall, and
(C) at least one colored or color-imparting substance selected from oil-soluble dyes and oil-soluble brighteners,
where data in parts by weight are based on the total weight of the microcapsules in question.

Microcapsules within the context of the present invention can have a diameter in the range from fractions of micrometers up to one millimeter.

In one embodiment of the present invention the average diameter of microcapsules according to the invention (number-average, determined by means of light scattering) is in the range from 0.5 to 100 μm, preferably up to 50 μm and particularly preferably up to 30 μm.

Core material (A) of the microcapsules according to the invention is a latent heat storage material, also known under the name PCM (Phase Change Material). Latent heat storage materials are substances which have a phase transition in the temperature range in which a transfer of heat is to be undertaken. According to the invention, the core material (A) is a lipophilic substance, which has a solid/liquid phase transition in the temperature range from −20 to 120° C.

Within the context of the present invention, lipophilic substances are those which have an octanol-water coefficient (octanol-water partition coefficient) of greater than 1 or a log $p_{OW}$ of greater than zero.

Examples of core materials (A) are:

aliphatic hydrocarbon compounds, such as saturated or unsaturated $C_{10}$-$C_{40}$-hydrocarbons, which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g. cyclohexane, cyclooctane, cyclodecane;

aromatic hydrocarbon compounds such as naphthalene, biphenyl, ortho- or meta-terphenyl, mono- or poly-$C_1$-$C_{40}$-alkyl-substituted and preferably n-$C_{10}$-$C_{40}$-alkyl-substituted aromatic hydrocarbons, such as para-xylene, n-dodecylbenzene, n-tetradecylbenzene, n-hexadecylbenzene, furthermore n-hexylnaphthalene and n-decylnaphthalene;

saturated or unsaturated $C_6$-$C_{30}$-fatty acids such as lauric acid, stearic acid, oleic acid or behenic acid, preferably eutectic mixtures of decanoic acid with e.g. myristic acid, palmitic acid or lauric acid;

fatty alcohols such as lauryl alcohol, stearyl alcohol, oleyl alcohol, myristyl alcohol, cetyl alcohol, mixtures such as coconut fatty alcohol and also the so-called oxo alcohols, which are obtained by hydroformylation of α-olefins and further reactions;

$C_6$-$C_{30}$-fatty amines, such as decylamine, dodecylamine, tetradecylamine or hexadecylamine;

esters such as $C_1$-$C_{10}$-alkyl esters of fatty acids, such as propyl palmitate, methyl stearate or methyl palmitate and also preferably their eutectic mixtures, or methyl cinnamate;

natural and synthetic waxes such as montanic acid waxes, montanic ester waxes, carnauba wax, polyethylene wax, oxidized waxes, polyvinyl ether wax, ethylene vinyl acetate wax or hard waxes by Fischer-Tropsch processes;

halogenated hydrocarbons, such as chloroparaffin, bromooctadecane, bromopentadecane, bromononadecane, bromoeicosane, bromodocosane.

Furthermore, mixtures of the aforementioned substances are suitable provided they do not result in a lowering of the melting point outside of the desired range, or the melting heat of the mixture becomes too slight for a meaningful application.

For example, the use of pure n-alkanes, n-alkanes with a purity greater than 80% or of alkane mixtures as are produced as technical grade distillate and are commercially available as such is advantageous.

Furthermore, it may be advantageous to add to the aforementioned lipophilic substances, compounds that are soluble therein as crystallization seeds in order to prevent the crystallization delay that sometimes occurs in the case, particularly of nonpolar lipophilic substances. As described in U.S. Pat. No. 5,456,852, it is advantageous to use compounds with a melting point which is 20 to 110° C. higher than that of the actual core substance. Suitable compounds are the fatty acids, fatty alcohols, fatty amides and aliphatic hydrocarbon compounds mentioned above as lipophilic substances. They are added in amounts of from 0.1 to 10% by weight, based on the capsule core.

The lipophilic core materials (A) are selected depending on the temperature range in which the application of the latent heat storage materials is desired. For example, for application in building materials in a moderate climate, preference is given to using core materials (A) with a solid/liquid phase transition in the temperature range from 0 to 60° C. For internal space applications, lipophilic core materials with a solid/liquid phase transition with conversion temperatures of from 15 to 30° C. can be chosen. For applications in the textile sector, especially conversion temperatures from 0 to 40° C. are advantageous.

Preferred lipophilic core materials (A) are aliphatic hydrocarbons, particularly preferably those listed above by way of example. Aliphatic hydrocarbons having 14 to 20 carbon atoms, and mixtures thereof, are very particularly preferred.

Furthermore, microcapsules according to the invention have a capsule wall (B). The capsule wall is preferably an organic polymer or an organic resin. Examples of organic resins are amino plastic resins, such as, for example, melamine-formaldehyde resins. However, the capsule wall is preferably an organic polymer which is formed by polymerization of one or more ethylenically unsaturated (co)monomers.

In one embodiment of the present invention the capsule wall (B) is a (co)polymer which is composed of 30 to 100% by weight, preferably up to 90% by weight, of at least one monomer I, selected from (meth)acrylic acid, maleic acid, $C_1$-$C_{24}$-alkyl esters of (meth)acrylic acid, preferably at least 2 different monomers I, 0 to 70% by weight, preferably at least 10% by weight, of one or more bi- or polyfunctional monomers (monomers II), which is or are insoluble or sparingly soluble in water and 0 to 40% by weight of one or more other monomers (monomers III).

Here, data in % by weight are based on the total weight of the capsule wall (B).

Capsule wall (B) comprises generally at least 30% by weight, preferably at least 40% by weight, particularly preferably at least 50% by weight, in particular at least 60% by weight, very particularly preferably at least 70% by weight, and up to 100% by weight, preferably at most 90% by weight, in particular at most 85% by weight and very particularly preferably at most 80% by weight, of at least one monomer I, in copolymerized form.

Preferably, at least 2 different monomers I are used for preparing the capsule wall (B).

Furthermore, capsule wall (B) comprises preferably at least 10% by weight, preferably at least 15% by weight, preferably at least 20% by weight and in general at most 70% by weight, preferably at most 60% by weight and particularly preferably at most 50% by weight of one or more bi- or polyfunctional monomers in copolymerized form which are insoluble or sparingly soluble in water (monomers II), based on the total weight of the capsule wall (B).

In addition, capsule wall (B) can comprise up to 40% by weight, preferably up to 30% by weight, in particular up to 20% by weight, of other monomers III in copolymerized form.

Preferably, capsule wall (B) is a copolymer which is composed only of monomers of groups I and II.

Suitable monomers I are $C_1$-$C_{24}$-alkyl esters of acrylic and/or methacrylic acid (monomers Ia). Furthermore, the unsaturated $C_3$- and $C_4$-carboxylic acids such as acrylic acid, methacrylic acid and also maleic acid (monomers Ib) are suitable. Particularly preferred monomers I are methyl acrylate, ethyl acrylate, n-propyl acrylate and n-butyl acrylate and/or the corresponding methacrylates. Preference is given to isopropyl acrylate, isobutyl acrylate, sec-butyl acrylate and tert-butyl acrylate and the corresponding methacrylates. In general, the methacrylates in question and methacrylic acid are preferred.

According to a preferred embodiment, capsule wall (B) is a copolymer which is composed of 25% by weight to 75% by weight of maleic acid and/or acrylic acid, in particular methacrylic acid.

Suitable monomers II are bi- or polyfunctional monomers, which are insoluble or sparingly soluble in water but which have a better solubility in the lipophilic substance. Sparing solubility in water is to be understood as meaning a solubility of less than 60 g/l at 20° C. Bi- or polyfunctional monomers are understood as meaning compounds which have at least two nonconjugated ethylenic double bonds. Primarily, divinyl and polyvinyl monomers are suitable. They effect a crosslinking of the capsule wall during the polymerization. One or more divinyl monomers and also one or more polyvinyl monomers can be incorporated by polymerization.

According to one preferred embodiment, the monomer II selected is a mixture of divinyl and polyvinyl monomers, where the fraction of the polyvinyl monomers is 2 to 90% by weight, based on the sum of divinyl and polyvinyl monomers. Preferably, the fraction of the polyvinyl monomers is 5 to 80% by weight, preferably 10 to 60% by weight, based on the sum of divinyl and polyvinyl monomers. For microcapsules with an average diameter of <2.5 μm, the polyvinyl fraction is preferably 20 to 80% by weight, in particular 30 to 60% by weight based on the sum of divinyl- and polyvinyl monomers. For microcapsules with an average diameter of ≧2.5 μm, the polyvinyl fraction is preferably 5 to 40% by weight, in particular 10 to 30% by weight based on the sum of divinyl and polyvinyl monomers.

Suitable divinyl monomers are divinylbenzene and divinylcyclohexane. Preferred divinyl monomers are the diesters of diols with acrylic acid or methacrylic acid, also the diallyl and divinyl ethers of these diols. By way of example, ethanediol diacrylate, ethylene glycol dimethacrylate, 1,3-butylene glycol dimethacrylate, methallyl methacrylamide, allyl acrylate and allyl methacrylate may be mentioned. Particular preference is given to ethanediol diacrylate, propanediol diacrylate, butanediol diacrylate, pentanediol diacrylate and hexanediol diacrylate and the corresponding methacrylates.

Preferred polyvinyl monomers are trivinylbenzene, trivinylcyclohexane and particularly preferably the polyesters of polyols with acrylic acid and/or methacrylic acid, also the polyallyl and polyvinyl ethers of these polyols. Very particular preference is given to trimethylolpropane triacrylate and methacrylate, pentaerythritol triallyl ether, pentaerythritol tetraallyl ether, pentaerythritol triacrylate and pentaerythritol tetraacrylate and their technical-grade mixtures.

Preference is given to the combinations of divinyl and polyvinyl monomers, such as 1,4-butanediol diacrylate and pentaerythritol tetraacrylate, 1,6-hexanediol diacrylate and pentaerythritol tetraacrylate, 1,4-butanediol diacrylate and trimethylol propane triacrylate and also 1,6-hexanediol diacrylate and trimethylol propane triacrylate.

Suitable monomers III are other monomers which are different from the monomers I and II, such as vinyl acetate, vinyl propionate, vinylpyridine and styrene or α-methylstyrene. Particular preference is given to monomers IIIa carrying charge or carrying ionizable groups, such as itaconic acid, 2-hydroxyethyl acrylate and methacrylate, acrylamido-2-methylpropanesulfonic acid, methacrylamide, N-vinylpyrrolidone, N-methylolacrylamide, N-methylolmethacrylamide, N,N-dimethylaminoethyl methacrylate and diethylaminoethyl methacrylate and, furthermore, maleic anhydride.

In one embodiment, capsule wall (B) is a copolymer which is composed of
30 to 90% by weight of one or more monomers I,
10 to 70% by weight of one or more monomers II, and
0 to 30% by weight of one or more monomers III,
in each case based on the total weight of the capsule wall (B).

Particularly preferably capsule wall (B) is a copolymer which is composed of
30 to 90% by weight of a mixture of monomers I a and I b, where the fraction of the monomers I b is <25% by weight,
10 to 70% by weight of a mixture of divinyl and polyvinyl monomers (monomers II), where the fraction of the polyvinyl monomers is 2 to 90% by weight, based on the monomers II, and
0 to 30% by weight of other monomers III,
in each case based on the total weight of the capsule wall (B), unless expressly stated otherwise.

In another particularly preferred embodiment, capsule wall (B) is a copolymer which is composed of
30 to 90% by weight of a mixture of monomers I a and I b, where the fraction of the monomer I b is 25% by weight,
10 to 70% by weight of a mixture of divinyl and polyvinyl monomers (monomers II), where the fraction of the polyvinyl monomers is 2 to 90% by weight, based on the monomers II, and
0 to 30% by weight of other monomers III,
in each case based on the total weight of the capsule wall (B), unless expressly stated otherwise.

In one embodiment of the present invention the weight ratio of lipophilic core material (A) to capsule wall (B) is in the range from 50:50 to 95:5, preferably from 70:30 to 93:7.

Furthermore, microcapsules according to the invention comprise at least one colored or color-imparting substance (C), selected from oil-soluble dyes and oil-soluble brighteners, which, within the scope of the present invention are also referred to in short as dye (C) or brightener (C).

Examples of dyes (C) are:

| | |
|---|---|
| Fluorol 7GA | Lambdachrome No. 5550 (Lambda Chrome Laser Dyes from Lambda Physik GmbH, Hans-Böckler-Str. 12, Göttingen) |
| Coumarin 47 | CAS Reg. No. 99-44-1 |
| Coumarin 102 | CAS Reg. No. 41267-76-9 |
| Coumarin 6H | CAS Reg. No. 58336-35-9 |
| Coumarin 30 | CAS Reg. No. 41044-12-6 |
| Fluorescein 27 | CAS Reg. No. 76-54-0 |
| Uranine | CAS Reg. No. 518-47-8 |
| Bis-MSB | CAS Reg. No. 13280-61-0 |
| DCM | CAS Reg. No. 51325-91-8 |
| Cresyl violet | CAS Reg. No. 41830-80-2 |
| Phenoxazone 9 | CAS Reg. No. 7385-67-3 |
| HITCI | CAS Reg. No. 19764-96-6 |
| I R 125 | CAS Reg. No. 3599-32-4 |
| I R 144 | CAS Reg. No. 54849-69-3 |
| HDITCI | CAS Reg. No. 23178-67-8 |
| Carbostyryl 7 | Lambdachrome ® No. 4220 (Lambda Physik GmbH) |
| Carbostyryl 3 | Lambdachrome No. 4350 (Lambda Physik GmbH) |

Further suitable dyes (C) are perylene dyes of the general formula I

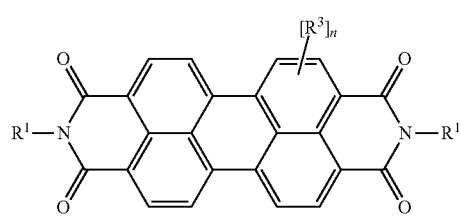

in which the variables are defined as follows:
$R^1$ are different and preferably identical and selected from $C_5$-$C_{20}$-alkyl, straight-chain or branched, in which a carbon atom may be replaced by an oxygen atom, or phenyl, which may be substituted one or more times by $C_1$-$C_{13}$-alkyl or $C_1$-$C_{13}$-alkoxy, for example n-pentyl, isoamyl, n-hexyl, isohexyl, n-heptyl, n-octyl, n-nonyl, n-decyl, isodecyl, n-dodecyl, n-tetradecyl, n-pentadecyl, n-hexadecyl, isohexadecyl, n-octadecyl, n-eicosyl, 2-n-propoxyethyl, 2-isopropoxyethyl, 2-n-butoxyethyl, 2- or 3-ethoxy-n-propyl, 2- or 3-n-propoxy-n-propyl, 2- or 3-isopropoxy-n-propyl, 2- or 3-n-butoxy-n-propyl, 2- or 3-methoxy-n-propyl, 2- or 4-methoxybutyl, 2- or 4-ethoxybutyl, 2- or 4-(2-ethylhexyloxy)butyl, 2-, 3- or 4-methylphenyl, 2,3-dimethylphenyl, 2,4-dimethylphenyl, 2,5-dimethylphenyl, 2,6-dimethylphenyl, 2,4-diethylphenyl, 2,5-diethylphenyl, 2,6-diethylphenyl, 2,4-diisopropylphenyl, 2,5-diisopropylphenyl, 2,6-diisopropylphenyl, 2-, 3- or 4-ethylphenyl, 2,6-diethyl-4-methylphenyl, 2,6-diethyl-4-methoxyphenyl, 2,5-diethyl-4-methylphenyl, 2,5-diethyl-4-methoxyphenyl, 2-n-hexylphenyl, 2-ethyl-6-isopropylphenyl, 2-(2-methylpentyl)phenyl, 2-isopropyl-6-isobutylphenyl, 2-isopropyl-2-sec-butylphenyl, 2-ethyl-6-isobutylphenyl, 2-ethyl-6-sec-butylphenyl, 2-n-octylphenyl, 2-methoxyphenyl, 2-ethoxyphenyl, 2,3-dimethoxyphenyl, 2,3-diethoxyphenyl, 2,4-dimethoxyphenyl, 2,4-diethoxyphenyl.

In one embodiment of the present invention the radicals $R^1$ are in each case identical and selected from —$CH_2CH_2CH_2$—O—$R^2$, where $R^2$ is selected from $C_2$-$C_8$-alkyl.

$R^3$ are different and in particular identical and selected from hydrogen, chlorine, phenoxy or from phenoxy substituted by halogen, $C_1$-$C_4$-alkyl or $C_1$-$C_4$-alkoxy, in particular 2-, 3- or 4-fluorophenoxy, 2-, 3- or 4-chlorophenoxy, 2-, 3- or 4-bromophenoxy, 2-, 3- or 4-tert-butylphenoxy, 2-, 3- or 4-n-butylphenoxy, 2-, 3- or 4-isobutylphenoxy, 2-, 3- or 4-n-butoxyphenoxy, 2-isopropyl-4-methylphenoxy, 2,3-, 2,4-, 2,5- or 2,6-dichlorophenoxy, 2,4,5- or 2,4,6-trichlorophenoxy, 2-, 3- or 4-methylphenoxy, 2,3-, 2,4-, 2,5- or 2,6-dimethylphenoxy, 2,4,5- or 2,4,6-trimethylphenoxy, 2-methyl-4-chlorophenoxy, 2-isopropylphenoxy, 2-, 3- or 4-n- or isopropoxyphenoxy, 2,4-dimethoxyphenoxy.

Further suitable radicals are disclosed in EP 0 692 517 A1 on page 5, line 39 ff.

n is an integer and selected from zero to 4.

Preference is given to perylene dyes of the general formula I a

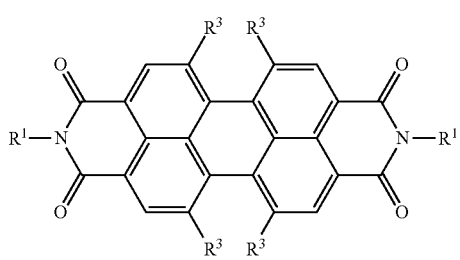

Ia in which the variables are as defined above.

Many perylene dyes of the general formula I are commercially available under the name Lumogen® from BASF SE. Examples are Lumogen® F—Red 305, Lumogen® F—Red 300, Lumogen® F—Yellow 083.

Further suitable perylene dyes are described in, for example, U.S. Pat. No. 4,618,694, DE 24 51 782 A1, U.S. Pat. No. 4,379,934 and U.S. Pat. No. 4,446,324.

Further suitable dyes (C) are oil-soluble azo dyes from the Sudan series, for example Sudan® Red, in particular Sudan® III and Sudan® IV, furthermore Sudan® Black, Sudan® Yellow (C.I. Solvent Yellow 124) and Sudan® Orange.

Further suitable examples are coumarin dyes according to U.S. Pat. No. 3,880,869, in particular those according to the general formula II

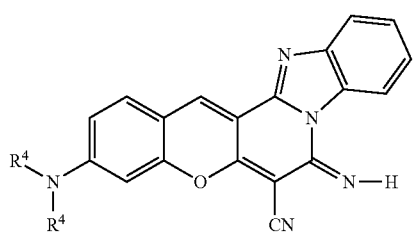

II in which $R^4$ are different or preferably identical and selected from $C_1$-$C_4$-alkyl, preferably linear $C_1$-$C_4$-alkyl and in particular in each case ethyl.

Furthermore, coumarin dyes of the general formula III are suitable

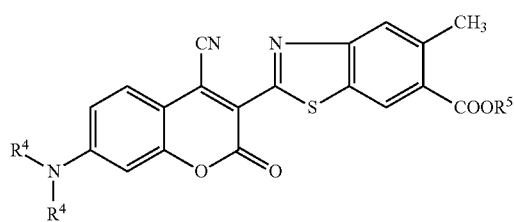

III in which $R^5$ is selected from $C_1$-$C_{11}$-alkyl and $R^4$ is as defined above.

Further suitable oil-soluble dyes can be found in WO 99/40123.

Suitable brighteners, in particular optical brighteners, are listed in the Color Index for example C.I. fluorescent brightener 1, 9, 14, 17, 20, 22, 24, 28, 28:1, 30, 32, 37, 46, 47, 49, 52, 54, 59, 61, 71, 79, 84, 85, 86, 87, 90, 90:1, 91, 104, 113, 114, 117, 119, 121, 123, 124, 130, 132, 134, 135, 136, 140, 144, 145, 146, 147, 148, 152, 153, 154, 162:1, 166, 167, 169, 170, 171, 173, 175, 176, 177, 179, 184, 184:1, 184:2, 185, 185:1, 185:2, 190, 191, 192, 194, 195, 196, 199, 200, 205, 210, 216, 217, 217:1, 218, 219, 219:1, 220, 222, 223, 224, 225, 226, 228, 229, 230, 231, 232, 234, 235, 236, 238, 239, 241, 242, 251, 252, 254, 257, 258, 261, 262, 263, 264, 265, 266, 267, 269, 271, 272, 273, 274, 275, 276, 277, 278, 279, 280, 289, 290, 291, 310, 311, 312, 313, 314, 315, 318, 321, 322, 326, 327, 328, 330, 332, 335, 336, 337, 338, 339, 340, 351, 352, 353, 354, 355, 357, 362, 363, 364, 365, 366, 367, 368, 369, 370, 371, 372, 373, 374, 374:1, 375, 376, 377, 378, 379, 380, 381, 382, 383, 384, 385, 386, 387 and 388.

Those aforementioned examples of optical brighteners which are present in the form of salts, can be converted to oil-soluble optical brighteners by re-salting them, for example by converting cationic optical brighteners into the salts of stearic acid. Preferably, microcapsules according to the invention have a sphere-like shape, i.e. are spherical.

Microcapsules according to the invention are particularly highly suitable for finishing areal substrates.

The present invention further provides a method of producing microcapsules according to the invention. Microcapsules according to the invention can advantageously be produced, by polymerizing the monomer or monomers from which it is desired to produce capsule wall (B) in the presence of lipophilic core material (A) and colored or color-imparting substance (C).

The present invention further provides a method of producing microcapsules, which comprises (co)polymerizing, in the presence of (A) in the range from 50 to 95 parts by weight, lipophilic core material which has a solid/liquid phase transition in the temperature range from −20 to 120° C., (C) in the range from 0.01 to 10 parts by weight, at least one colored or color-imparting substance selected from oil-soluble dyes and oil-soluble brighteners, in the range from 4 to 50 parts by weight of a monomer or a mixture of monomers:

30 to 100% by weight of at least one monomer (monomer I), selected from acrylic acid, methacrylic acid, maleic acid and $C_1$-$C_{24}$-alkyl esters of (meth)acrylic acid, 0 to 70% by weight of one or more bi- or polyfunctional monomers (monomers II), which is or are insoluble or sparingly soluble in water and 0 to 40% by weight of one or more other monomers (monomers III), where data in % by weight are based on the total weight of the monomers I, II and III, and where data in parts by weight are based on the total weight of the finished microcapsules.

Here monomers I to III are as defined above.

In one embodiment of the production method according to the invention, the procedure involves selecting the (co)polymerization temperature above the temperature at which lipophilic core material (A) has its solid/liquid phase transition.

Microcapsules according to the invention can be produced in one embodiment by a so-called in-situ polymerization. The principle of microcapsule formation here is based on preparing a stable oil-in-water emulsion from the monomer or the monomers, at least one free-radical initiator, at least one protective colloid and the lipophilic core material (A) to be encapsulated. The polymerization of the monomers is then triggered by heating and controlled, if appropriate, by further temperature increase, during which the resulting polymers form the capsule wall which surrounds the lipophilic substance. This general principle is described, for example in DE-A-10 139 171.

In many embodiments, microcapsules according to the invention are prepared in the presence of at least one organic or inorganic protective colloid. Both organic and inorganic protective colloids may be ionic or neutral. Protective colloids here may be used either individually or else in mixtures of two or more identically or differently charged protective colloids.

Depending on the preparation method and the protective colloid chosen, this can likewise be a constituent of microcapsules according to the invention. Thus, up to 10% by weight, based on the total weight of the microcapsules according to the invention, can be protective colloid. According to this embodiment, microcapsules according to the invention have protective colloid on the surface of the polymer.

Organic protective colloids are preferably water-soluble polymers, which reduce the surface tension of the water from 73 mN/m maximum to 45 to 70 mN/m and thus ensure the formation of closed capsule walls (B) and in so doing form microcapsules according to the invention with preferred particle sizes in the range from 0.5 to 100 µm, preferably to 50 µm, particularly preferably 0.5 to 30 µm and very particularly preferably 0.5 to 10 µm. Preferably, organic protective colloids are organic neutral, i.e. nonionic, protective colloids.

According to a further embodiment, organic neutral protective colloids are preferred. Particular preference is given to protective colloids carrying OH groups, such as polyvinyl alcohols and partially hydrolyzed polyvinyl acetates.

Organic neutral protective colloids are for example, cellulose derivatives such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, casein, polyethylene glycols, polyvinyl alcohol and partially-hydrolyzed polyvinyl acetates and also methylhydroxypropylcellulose. Preferred organic neutral protective colloids are polyvinyl alcohol and partially hydrolyzed polyvinyl acetates, and methylhydroxypropylcellulose.

According to a preferred embodiment, mixtures of organic neutral protective colloids such as polyvinyl alcohols are used together with cellulose derivatives.

The use of polyvinyl alcohol and/or partially hydrolyzed polyvinyl acetate leads to stable emulsions even at small average droplet diameters such as 1.5 to 2.5 µm. Here, the diameter of the oil droplets almost corresponds to the diameter of the microcapsules present after the polymerization.

In general, protective colloid, in particular polyvinyl alcohol or partially hydrolyzed polyvinyl acetate, is used in a total amount of at least 3% by weight, preferably from 6 to 8% by weight, based on the microcapsules according to the invention to be prepared (without protective colloid). In this connection, it is possible to add further abovementioned protective colloids in addition to the preferred amount of polyvinyl alcohol or partially hydrolyzed polyvinyl acetate.

In one embodiment, microcapsules according to the invention are prepared only with polyvinyl alcohol and/or partially hydrolyzed polyvinyl acetate and without the addition of further protective colloids.

Polyvinyl alcohol is obtainable through polymerization of vinyl acetate, if appropriate in the presence of comonomers, and hydrolysis of the polyvinyl acetate with the elimination of the acetyl groups and formation of hydroxyl groups. The degree of hydrolysis of the polyvinyl acetates can be, for example, 1 to 100% and is preferably in the range from 50 to 100%, in particular from 65 to 95%. Within the context of this application, partially hydrolyzed polyvinyl acetates are to be understood as meaning a degree of hydrolysis of <50% and polyvinyl alcohol from ≧50 to 100%. The preparation of homopolymers and copolymers of vinyl acetate and also the hydrolysis of these polymers to form polymers comprising vinyl alcohol units is known per se. Polymers comprising vinyl alcohol units are sold, for example, as Mowiol® grades by Kuraray Specialties Europe (KSE).

Preference is given to using polyvinyl alcohols or partially hydrolyzed polyvinyl acetates whose viscosity of a 4% by weight aqueous solution at 20° C. according to DIN 53015 has a value in the range from 3 to 56 mPa·s, preferably a value of from 14 to 45 mPa·s. Preference is given to using polyvinyl alcohols with a degree of hydrolysis of ≧65%, preferably ≧70%, in particular ≧75%.

Organic anionic protective colloids are sodium alginate, polymethacrylic acid and its copolymers, the copolymers of sulfoethyl acrylate and methacrylate, sulfopropyl acrylate and methacrylate, of N-(sulfoethyl)maleimide, of 2-acrylamido-2-alkylsulfonic acids, styrenesulfonic acid, and also of vinylsulfonic acid. Preferred organically anionic protective colloids are naphthalenesulfonic acid and naphthalene-sulfonic acid-formaldehyde condensates, and especially polyacrylic acids and phenolsulfonic acid-formaldehyde condensates.

Inorganic protective colloids to be mentioned are so-called Pickering systems, which permit a stabilization through very fine solid particles and are insoluble, but dispersible, in water, or are insoluble and not dispersible in water, but wettable by lipophilic core material (A). The mode of action and their use is described in EP 1 029 018 A and EP 1 321 182 A.

A Pickering system here can consist of the solid particles on their own or additionally of auxiliaries which improve the dispersibility of the particles in water or the wettability of the particles by the lipophilic phase.

The inorganic solid particles may be metal salts, such as salts, oxides and hydroxides of calcium, magnesium, iron, zinc, nickel, titanium, aluminum, silicon, barium and manganese. Magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide are to be mentioned. Silicates, bentonite, hydroxylapatite and hydrotalcites may likewise be mentioned. Particular preference is given to highly disperse silicas, magnesium pyrophosphate and tricalcium phosphate.

Pickering systems can initially be added to the water phase or be added to the stirred oil-in-water emulsion. Some fine, solid particles are prepared by a precipitation, as described in EP-A-1 029 018, and EP-A-1 321 182.

Highly disperse silicas can be dispersed in water as fine, solid particles. However, it is also possible to use so-called colloidal dispersions of silica in water. Such colloidal dispersions are alkaline, aqueous mixtures of silica. In the alkaline pH range, the silica particles are swollen and stable in water. For a use of these dispersions as Pickering system, it is advantageous if the pH of the oil-in-water emulsion is adjusted to a pH in the range from 2 to 7 using an acid.

In general, protective colloid is used in amounts of from in total 0.1 to 15% by weight, preferably from 0.5 to 10% by weight, based on the water phase. For inorganic protective colloids preference is given here to choosing amounts of from 0.5 to 15% by weight, based on the water phase. Organic protective colloids are preferably used in amounts from 0.1 to 10% by weight, based on the water phase of the emulsion.

According to one embodiment, inorganic protective colloids and also their mixtures with organic protective colloids are preferred.

In addition, it is possible, for the costabilization of surfactants, preferably to add nonionic surfactants. Suitable surfactants can be found in the "Handbook of Industrial Surfactants", to the contents of which reference is expressly made. The surfactant or the surfactants can be used in an amount of from 0.01 to 10% by weight, based on the water phase of the emulsion.

Free-radical initiators which can be used for the free-radical polymerization reaction are the customary peroxo and azo compounds, preferably in amounts of from 0.2 to 5% by weight, based on the weight of the monomer or the monomers.

Depending on the aggregate state of the free-radical initiator and its solubility behavior, it can be introduced as it is, but preferably in the form of a solution, emulsion or suspension, as a result of which small quantitative amounts of free-radical initiator in particular can be metered in more precisely.

Preferred free-radical initiators to be mentioned are tert-butyl peroxoneodecanoate, tert-amyl peroxypivalate dilauroyl peroxide, tert-amyl peroxy-2-ethylhexanoate, 2,2'-azobis(2,4-dimethyl)valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl)peroxide, 4,4'-azobisisobutyronitrile, tert-butyl perpivalate and dimethyl 2,2-azobisisobutyrate. These have a half-life of 10 hours in a temperature range from 30 to 100° C.

Furthermore it is possible, for the (co)polymerization, to add regulators known per se in customary amounts, such as tert-dodecyl mercaptan or ethylhexyl thioglycolate.

As a rule, the polymerization is carried out at temperatures in the range from 20 to 122° C. and preferably from 40 to 95° C. Depending on the lipophilic core material (A) used, the oil-in-water emulsion should form at a temperature at which lipophilic core material (A) is liquid/oily. Correspondingly, a free-radical initiator is chosen whose decomposition temperature is above this temperature, and the polymerization is carried out at 2 to 50 K above this temperature, so that, if appropriate, free-radical initiators are chosen whose decomposition temperature is above the solid/liquid phase transition of the lipophilic core material (A).

One process variant which is preferably chosen when using lipophilic core material with a melting point up to a maximum of 60° C. is to start the (co)polymerization at a temperature at 60° C. and to increase the temperature to 85° C. in the course of the reaction. Free-radical initiators advantageous for this variant have a 10-hour half-life in the range from 45 to 65° C., for example tert-butyl perpivalate.

One process variant which is preferably chosen when using lipophilic core material with a melting point above 60° C. is a temperature program which starts at correspondingly higher reaction temperatures. For starting temperatures around 85° C., free-radical initiators with a 10-hour half-life in the range from 70 to 90° C. are chosen, preferably tert-butyl per-2-ethyl hexanoate.

Expediently, the (co)polymerization is undertaken at standard pressure, although it is also possible to work at reduced or slightly elevated pressure, e.g. at a polymerization temperature above 100° C., i.e. in the range from 0.5 to 5 bar.

The reaction times of the (co)polymerization are normally 1 to 10 hours, in most cases 2 to 5 hours.

One advantageous process variant using polyvinyl alcohol and/or partially hydrolyzed polyvinyl acetate permits an advantageous procedure according to which dispersion and polymerization are carried out directly at elevated temperature.

The method according to the invention gives an aqueous dispersion of microcapsules according to the invention.

After the actual polymerization, it is generally advantageous to render the aqueous dispersion of microcapsules according to the invention largely free from odor carriers, such as residual monomers and other volatile organic constituents. This can be achieved physically through distillative removal (in particular via steam distillation) or by stripping with an inert gas. In addition, it may take place chemically, as described in WO 99/24525, advantageously by redox-initiated polymerization, as described in DE-A 44 35 423, DE-A 44 19 518 and DE-A 44 35 422.

In this way it is possible to prepare microcapsules according to the invention with an average particle diameter in the range from 0.5 to 100 µm, where the particle diameters can be adjusted in a manner known per se, via the shear force, the stirring speed, choice of protective colloid or colloids and its or their concentration. Preference is given to microcapsules according to the invention with an average particle diameter in the range from 0.5 to 50 µm, preferably 0.5 to 30 µm, in particular 3 to 7 µm (number-average, determined by means of light scattering).

It is possible to treat microcapsules according to the invention with polyelectrolyte, which may possibly further improve the tightness of the capsules. Within the context of the present invention, polyelectrolytes are understood as meaning polymers with ionizable or ionically dissociatable groups which may be a constituent or substituent of the polymer chain. Usually, the number of these ionizable or ionically dissociatable groups in the polyelectrolyte is such that the polymers are water-soluble in the ionic form (also called polyions). Preference is given to polyelectrolytes which have a solubility of ≧4 g/l in water at 25° C., in particular polyelectrolytes with unlimited solubility or swellability in water. Preference is given to polyelectrolytes which bear an electrolyte functionality on each repeat unit. In contrast to protective colloids, polyelectrolytes generally have no or only a slight emulsifying effect, whereas polyelectrolytes predominantly have a thickening effect instead. Within the context of the present invention polyelectrolytes can have an average molecular weight Mw of from 500 to 10 000 000 g/mol, preferably 1000 to 100 000 g/mol, in particular 1000 to 10 000 g/mol. Linear or branched polyelectrolytes can be used.

A distinction is made between cationic and anionic polyelectrolytes (also referred to as polyion) depending on the type of dissociatable groups. What is taken into consideration here is the charge of the polyion (without counterion). Cationic polyelectrolytes are formed from polymers comprising basic groups (polybases) through the addition reaction of protons or quaternization.

Anionic polyelectrolytes are formed from polymers comprising acidic groups (polyacids) through elimination of protons.

The polyelectrolyte is assigned here according to the resulting overall charge of the polyion (i.e. without counterion). If the polyelectrolyte has predominantly positively charged dissociated groups, then it is a cationic polyelectrolyte. If, on the other hand, it has predominantly negatively charged groups, then it is an anionic polyelectrolyte. Preference is given to using one or more cationic or one or more anionic polyelectrolytes. One or more cationic polyelectrolytes are particularly preferably chosen. It is assumed that upon the successive addition of a plurality of differently charged polyelectrolytes, the construction of a plurality of layers takes place provided the amount of polyelectrolyte suffices in each case for the construction of a layer. As a rule, an amount of polyelectrolyte of at least 1% by weight of polyelectrolyte, leads, based on the total weight of the microcapsules carrying polyelectrolyte, to a coating. However, preferably only one polyelectrolyte layer is applied. This layer can be one polyelectrolyte or a mixture of two or more equally charged polyelectrolytes.

Anionic polyelectrolytes are obtainable, for example, by free-radical polymerization of ethylenically unsaturated anionic monomers in aqueous medium. Suitable ethylenically unsaturated anionic monomers are, for example, monoethylenically unsaturated C3- to C5-carboxylic acids such as acrylic acid, methacrylic acid, ethacrylic acid, crotonic acid, maleic acid, fumaric acid and itaconic acid, sulfonic acids such as vinylsulfonic acid, styrenesulfonic acid and acrylamidomethylpropanesulfonic acid and phosphonic acids, such as vinylphosphonic acid, and/or in each case the alkali metal, alkaline earth metal and/or ammonium salts of these acids.

The preferably used anionic monomers include acrylic acid, methacrylic acid, maleic acid and acrylamido-2-methylpropanesulfonic acid. Particular preference is given to aqueous dispersions of polymers based on acrylic acid. The anionic monomers can either be polymerized on their own to give homopolymers or else in a mixture with one another to give copolymers. Examples thereof are the homopolymers of acrylic acid, homopolymers of methacrylic acid or copolymers of acrylic acid and maleic acid, copolymers of acrylic acid and methacrylic acid, and copolymers of methacrylic acid and maleic acid.

However, the polymerization of the anionic monomers can also be carried out in the presence of at least one other ethylenically unsaturated monomer. These monomers may be nonionic or else carry a cationic charge.

Examples of nonionic comonomers are acrylamide, methacrylamide, N—$C_1$- to $C_3$-alkylacrylamides, N-vinylformamide, acrylic acid esters of monohydric alcohols having 1 to 20 carbon atoms, such as, in particular methyl acrylate, ethyl acrylate, isobutyl acrylate and n-butyl acrylate, methacrylic acid esters of monohydric alcohols having 1 to 20 carbon atoms, e.g. methyl methacrylate and ethyl methacrylate, and also vinyl acetate and vinyl propionate.

Suitable cationic monomers which can be copolymerized with the anionic monomers are dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and the cationic monomers quaternized and/or neutralized in each case with mineral acids. Individual examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamide and diethylaminopropylacrylamide.

The cationic monomers can be completely or else only partially neutralized or quaternized, e.g. in each case to 1 to 99%. A preferably used quaternizing agent for the cationic monomers is dimethyl sulfate. However, it is also possible to carry out the quaternization of the monomers with diethyl sulfate or with alkyl halides such as methyl chloride, ethyl chloride or benzyl chloride. The comonomers are used in the preparation of the anionic polyelectrolytes, for example, in amounts such that the resulting polymer dispersions, upon dilution with water and at a pH above 7.0 and a temperature of 20° C., are water-soluble and have an anionic charge. Based on the monomers used overall in the polymerization, the amount of nonionic and/or cationic comonomers is, for example, 0 to 99% by weight, preferably 5 to 75% by weight and is in most cases in the range from 5 to 25% by weight. The cationic monomers are used here at most in an amount such that the resulting polyelectrolytes overall carry an anionic charge at a pH of <6.0 and a temperature of 20° C. The anionic excess charge in the resulting amphoteric polymers is, for example, at least 5 mol %, preferably at least 10 mol %, in particular at least 30 mol %, very particularly preferably at least 50 mol %.

Examples of preferred copolymers are copolymers of 25 to 90% by weight of acrylic acid and 75 to 10% by weight of acrylamide. Preferably, at least one ethylenically unsaturated C3 to C5-carboxylic acid is polymerized in the absence of other monoethylenically unsaturated monomers. Particular preference is given to homopolymers of acrylic acid which are obtainable by free-radical polymerization of acrylic acid in the absence of other monomers.

Crosslinkers which can be used for the preparation of branched polyelectrolytes are all compounds which have at least two ethylenically unsaturated double bonds in the molecule. Such compounds are used, for example in the preparation of crosslinked polyacrylic acids, such as superabsorbent polymers, cf. EP-A 0 858 478, page 4, line 30 to page 5, line 43. Examples of crosslinkers are triallylamine, pentaerythritol triallyl ether, pentaerythritol tetraallyl ether, methylenebisacrylamide, N,N'-divinylethyleneurea, allyl ethers comprising at least two allyl groups or vinyl ethers having at least two vinyl groups of polyhydric alcohols such as, for example, sorbitol, 1,2-ethanediol, 1,4-butanediol, trimethylolpropane, glyceryl, diethylene glycol and of sugars, such as sucrose, glucose, mannose, dihydric alcohols having 2 to 4 carbon atoms esterified completely with acrylic acid or methacrylic acid, such as ethylene glycol dimethacrylate, ethylene glycol diacrylate, butanediol dimethacrylate, butanediol diacrylate, diacrylates or dimethacrylates of polyethylene glycols with molecular weights of from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate and triallylmethylammonium chloride. If, during the preparation of the dispersions according to the invention, crosslinkers are used, then the amounts of crosslinkers used in each case are, for example 0.0005 to 5.0, preferably 0.001 to 1.0, % by weight, based on the monomers used overall in the polymerization. Preferably used crosslinkers are pentaerythritol triallyl ether, pentaerythritol tetraallyl ether, N,N'-divinylethyleneurea, allyl ethers comprising at least two allyl groups of sugars such as sucrose, glucose or mannose and triallylamine, and mixtures of these compounds.

Furthermore, polycondensates such as, for example, phenolsulfonic acid resins, can be used as anionic polyelectrolytes. Aldehyde condensates, particularly those based on formaldehyde, acetaldehyde, isobutyraldehyde, propionaldehyde, glutaraldehyde and glyoxal, very particularly formaldehyde condensates based on phenolsulfonic acids are suitable. Further reactive compounds which can be co-used for preparing the phenolsulfonic acid resins are, for example, amines or amides, in particular those of carbonic acid, such as, for example, urea, melamine or dicyanodiamide.

The phenolsulfonic acid resins are preferably in the form of salts. Preferably, the condensation products have a degree of condensation of from 5 to 100 and an average molecular weight $M_w$ of from 500 to 10 000 g/mol. The preparation of the phenolsulfonic acid resins preferably takes place analogously to the manner stated in EP-A 816 406.

Suitable cationic polyelectrolytes are, for example, polymers from the group of
- (a) polymers comprising vinylimidazolium units,
- (b) polydiallyldimethylammonium halides,
- (c) polymers comprising vinylamine units,
- (d) polymers comprising ethyleneimine units,
- (e) polymers comprising dialkylaminoalkyl acrylate and/or dialkylaminoalkyl methacrylate units and
- (f) polymers comprising dialkylaminoalkylacrylamide and/or dialkylaminoalkylmethacrylamide units.

Such polymers are known and commercially available. The monomers on which the cationic polyelectrolytes of groups (a) to (f) are based, can be used for the polymerization here in the form of the free base, but preferably in the form of their salts with mineral acids such as hydrochloric acid, sulfuric acid or phosphoric acid, and also in quaternized form. Suitable quaternizing agents are, for example, dimethyl sulfate, diethyl sulfate, methyl chloride, ethyl chloride, cetyl chloride or benzyl chloride.

In one variant of the method according to the invention microcapsules according to the invention can be isolated after the (co)polymerization, for example by filtration or in particular by spray-drying.

The present invention further provides the use of microcapsules according to the invention for the finishing of areal substrates. The present invention further provides a method of finishing areal substrates using microcapsules according to the invention. The present invention further provides areal substrates finished with microcapsules according to the invention.

Areal substrates according to the invention have not only a good thermal behavior in a form which allows their temperature at which they can store heat to be adjusted very readily. They also have a brilliant color with a very good fastness.

In one embodiment of the present invention, areal substrates are selected from building materials and fibrous substrates. Building materials are, for example, cement, concrete, mortar, foam materials such as, for example, foamed polystyrene or foamed polyurethane, adhesives for the building sector, such as, for example, tile adhesives, also plastics, in particular technical plastics such as styrene copolymers, polyvinyl chloride, polyolefins, polyesters or polyamides, for example as building components or in the form of films.

Fibrous substrates may be, for example: textiles, paper, paperboard, cardboard, carpets, in particular rough-fiber carpets, wood, backplates, hard-fiber plates, mineral fibers, wools, nonwovens and wovens, for example made of glass. Within the context of the present invention, textiles may be: textile fibers, textile semi-finished and finished products and finished articles manufactured therefrom which, as well as textiles for the clothing industry, also comprise, for example, carpets and other home textiles, further also mattresses, and also textile constructions for industrial purposes. These include unshaped constructions such as, for example, staples, linear constructions such as twine, filaments, yarns, lines, strings, laces, braids and cordage and also three-dimensional constructions such as for example, felts, wovens, knits, nonwovens and waddings. The textiles can be of natural origin, for example, cotton, wool or flax, or synthetic, for example polyamide, polyester, modified polyester, polyester blend fabric, polyamide blend fabric, polyacrylonitrile, triacetate, acetate, polycarbonate, polypropylene, polyvinyl chloride, polyester microfibers and glass fiber fabric.

Further particularly suitable areal substrates are leather and in particular artificial leather.

For the finishing of textile with microcapsules according to the invention it is possible, for example, to incorporate microcapsules according to the invention into the fibers, for example during spinning.

In another variant, it is possible to coat, impregnate, spray, print areal substrate with microcapsules according to the invention or to apply microcapsules according to the invention to areal substrate by slop-padding.

In another variant it is possible to incorporate microcapsules according to the invention into a formulation, in particular into an aqueous formulation and thus to coat areal substrate. Such formulations and in particular aqueous formulations are likewise provided by the present invention and are also referred to as microcapsule formulations according to the invention.

Examples of suitable aqueous microcapsule formulations are printing pastes and dye liquors, and also coating compositions.

Preferred aqueous microcapsule formulations furthermore comprise a binder.

Within the context of the present invention, binders are emulsified or dispersed film-forming polymers, which also include copolymers. Binders which can be used are both dispersions, emulsions and also organisols of (co)polymers, such as, for example polyacrylates, polyurethanes, polybutadiene, polyolefins such as polyethylene or polypropylene and copolymers thereof. Preference is given to dispersions or emulsions of polyacrylates or polyurethanes.

Suitable polyacrylates which are preferably to be mentioned as binders within the context of the present invention, are those copolymers, in particular emulsion copolymers, of at least one monoethylenically unsaturated carboxylic acid or dicarboxylic acid, such as, for example, maleic acid, fumaric acid, crotonic acid, itaconic acid or preferably (meth)acrylic acid with at least one comonomer, such as, for example, at least one $C_1$-$C_{10}$-alkyl ester of at least one monoethylenically unsaturated carboxylic acid or dicarboxylic acid, in particular mention may be made of methyl (meth)acrylate, ethyl acrylate, n-butyl acrylate and 2-ethylhexyl acrylate, and/or at least one further comonomer, selected from, for example, vinyl aromatics, for example para-methylstyrene, α-methylstyrene and in particular styrene, and nitrogen-containing comonomers such as (meth)acrylamide or (meth)acrylonitrile.

In one embodiment of the present invention, polyacrylates which are suitable as binders comprise at least one reactive comonomer in copolymerized form, selected from glycidyl (meth)acrylate, acetoacetyl(meth)acrylate and N-methylol (meth)acrylamide.

Suitable polyurethanes which are preferably to be mentioned as binders within the context of the present invention are hydroxyl-terminated polyurethanes which can be prepared by reacting at least one polyesterol, for example a condensation product of an aliphatic dicarboxylic acid such as succinic acid, glutaric acid and in particular adipic acid, with at least one aliphatic diol, for example 1,6-hexanediol, 1,4-butanediol, neopentyl glycol, ethylene glycol or diethylene glycol, and a diisocyanate or polyisocyanate and, if appropriate, further reactants. Suitable diisocyanates are aliphatic, cycloaliphatic and aromatic diisocyanates, in particular hexamethylene diisocyanate (HDI), dodecamethylene diisocyanate, 4,4'-diisocyanatocyclo-hexylmethane (MDI), cyclohexane-1,4-diisocyanate, isophorone diisocyanate (IPDI) and aromatic diisocyanates such as, for example, tolylene diisocyanate (TDI).

Further reactants which may be mentioned are, for example, diols, in particular 1,4-butanediol, and molecules containing acid groups, in particular diols containing acid groups and diamines containing acid groups, e.g. 3,3-dihydroxymethylolpropionic acid and the compound of the formula IV.

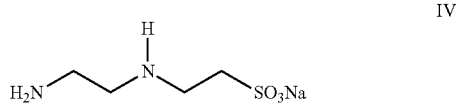

IV

In one embodiment of the present invention, printing pastes according to the invention are those which comprise at least one nonionic surfactant. Suitable nonionic surfactants are, for example, ethoxylated mono-, di- and tri-$C_4$-$C_{12}$-alkylphenols (degree of ethoxylation: 3 to 50) and also ethoxylated $C_8$-$C_{36}$-fatty alcohols (degree of ethoxylation: 3 to 80). Customary nonionic surfactants are commercially available, for example, as Lutensol® brands from BASF SE.

Printing pastes according to the invention are preferably aqueous preparations which have a viscous consistency. The dynamic viscosity of printing pastes according to the invention can, at 20° C., be, for example, in the range from 50 to 150 dPa·s, preferably 60 to 100 dPa·s, in another embodiment in the range from 10 to 55 dPa·s, determined for example in accordance with DIN iso 2555.

Aqueous microcapsule formulations according to the invention, in particular coating compositions or printing pastes, can comprise one or more thickeners. Examples of suitable thickeners are specified above. Further examples of suitable thickeners are water-soluble polymers of ethylenically unsaturated monomers, as described in WO 05/12378.

In one embodiment of the present invention aqueous microcapsule formulations according to the invention, in particular printing pastes, comprise one or more nonionic surfactants. Examples of suitable nonionic surfactants are specified above.

In one embodiment of the present invention aqueous microcapsule formulations according to the invention and in particular printing pastes according to the invention are free from alkyl esters of dicarboxylic acids.

Aqueous microcapsule formulations according to the invention, in particular printing pastes according to the invention, can comprise one or more additives besides the aforementioned constituents, for example fastness improvers, hand improvers, antifoams, wetting agents, leveling agents, water softeners, such as, for example complexing agents, fixatives (fixing agents), emulsifiers, water retention agents, such as, for example, glycerol or urea, active ingredients, such as, for example biocides or flame retardants.

Suitable fastness improvers are, for example, silicone oils and polysiloxanes that are liquid at room temperature. In one preferred variant of the present invention, it is possible to dispense with the use of fastness improvers.

Suitable antifoams are, for example, silicone-containing antifoams, such as, for example, those of the formula HO—$(CH_2)_3$—$Si(CH_3)[OSi(CH_3)_3]_2$, non alkoxylated or alkoxylated with up to 20 equivalents of alkylene oxide and in particular ethylene oxide. Silicone-free antifoams are also suitable, such as, for example, polyalkoxylated alcohols, e.g. fatty alcohol alkoxylates, preferably 2 to 50-fold ethoxylated preferably unbranched $C_{10}$-$C20$-alkanols, unbranched $C_{10}$-$C_{20}$-alkanols and 2-ethylhexan-1-ol. Further suitable antifoams are fatty acid $C_8$-$C_{20}$-alkyl esters, preferably stearic acid $C_{10}$-$C_{20}$-alkyl esters, in which $C_8$-$C_{20}$-alkyl, preferably $C_{10}$-$C_{20}$-alkyl, may be unbranched or branched.

Suitable wetting agents are, for example, nonionic, anionic or cationic surfactants, in particular ethoxylation and/or propoxylation products of fatty alcohols or propylene oxideethylene oxide block copolymers, ethoxylated or propoxylated fatty or oxo alcohols, and also ethoxylates of oleic acid or alkylphenols, alkylphenol ether sulfates, alkyl polyglycosides, alkyl phosphonates, alkylphenyl phosphonates, alkyl phosphates or alkylphenyl phosphates.

Suitable leveling agents are, for example, block copolymers of ethylene oxide and propylene oxide with molecular weights $M_n$ in the range from 500 to 5000 g/mol, preferably from 800 to 2000 g/mol. Very particular preference is given to block copolymers of propylene oxide/ethylene oxide, for example of the formula $EO_8PO_7EO_8$, where EO is ethylene oxide and PO is propylene oxide.

Suitable complexing agents are, for example, the tetrasodium salt of ethylenediaminetetraacetic acid and the trisodium salt of nitrilotriacetic acid, and also phosphonates, phosphates and polyphosphates of alkali metals.

Examples of suitable fixatives are melamine derivatives, which may be alkoxylated, alkoxyalkylated or reacted to give hemiaminals, hydrophilized isocyanurates, polyglycidyl ethers having 2 to 5 glycidyl groups per molecule, carbodiimides, urea or urea derivatives, which may, if appropriate be reacted to give hemiaminals or animals.

Very particularly preferred fixatives are carbodiimides, in particular polymeric carbodiimides. Examples of polymeric carbodiimides are obtainable by condensation or polycondensation of at least one aromatic diisocyanate, for example 2,4-tolylene diisocyanate, 4,4'-diphenylmethane diisocyanate or 1,7-naphthylene diisocyanate or at least one aliphatic or cycloaliphatic carbodiimide such as, for example, isophorone diisocyanate, trimethylene diisocyanate, tetramethylene diisocyanate, hexamethylene diisocyanate, dodecamethylene diisocyanate, cyclohexane 1,4-diisocyanate, 2,4-hexahydrotolylene diisocyanate, 2,6-hexahydrotolylene diisocyanate and 4,4'-dicyclohexylmethane diisocyanate.

Preferred polymeric carbodiimides are copolycarbodiimides, obtainable by condensation or polycondensation of at least one aromatic diisocyanate, for example 2,4-tolylene diisocyanate, 4,4'-diphenylmethane diisocyanate or 1,7-naphthylene diisocyanate, having at least one aliphatic or cycloaliphatic carbodiimide, such as, for example, isophorone diisocyanate, trimethylene diisocyanate, tetramethylene diisocyanate, hexamethylene diisocyanate, dodecamethylene diisocyanate, cyclohexane-1,4-diisocyanate, 2,4-hexahydrotolylene diisocyanate, 2,6-hexahydrotolylene diisocyanate and 4,4'-dicyclohexylmethane diisocyanate.

Very particular preference is given to polymeric carbodiimides obtainable by polycondensation of m-TMXDI or p-TMXDI

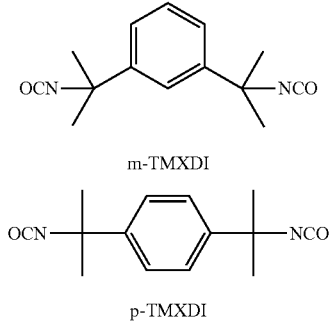

m-TMXDI p-TMXDI or mixtures of m-TMXDI and p-TMXDI with 2 to 20, preferably up to 15 and particularly preferably up to 10-N=C=N groups per molecule.

The aforementioned polymeric carbodiimides are particularly highly effective in combination with one or more diols, for example ethylene glycol, diethylene glycol, triethylene glycol, tetraethylene glycol, 1,3-propanediol, 1,4-butanediol, propylene glycol, dipropylene glycol, tripropylene glycol, tetrapropylene glycol, butylene glycol, 1,6-hexanediol, 1,5-pentanediol, polyethylene glycol with an average molecular weight $M_n$ in the range from 200 to 5000 g/mol, polypropylene glycol with an average molecular weight $M_n$ in the range from 200 to 5000 g/mol, polytetrahydrofuran with a molecular weight $M_n$ in the range from 200 to 5000 g/mol, ethylene oxide-propylene oxide copolymers, in particular block copolymers of ethylene oxide and propylene oxide.

Also of suitability are aromatic diols such as, for example, resorcinol, hydroquinone, 4,4'-diphenyldiol, hydroquinone di(parahydroxybenzoic acid ester), bisphenol A and also alkoxylation products, in particular ethoxylation products and propoxylation products of the abovementioned aromatic diols, such as, for example, compounds of the general formula V

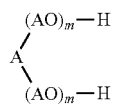

V where the variables are defined as follows:

A is a divalent organic radical with a to 40 carbon atoms, preferably 2 to 30 carbon atoms, preferably an organic diol, in particular an organic radical with at least one, preferably at least two phenyl rings, which may be substituted, for example, para-O—C6H4-O—, para,para'-O—C6H4-C6H4-O—, para,para'-O—$C_6H_4$—$C(CH_3)_2$—$C_6H_4$—O—, AO is selected from $C_2$-$C_4$-alkylene oxide, for example butylene oxide, in particular ethylene oxide $CH_2CH_2O$ ("EO") and propylene oxide $CH_2C(CH_3)O$ ("PO")

m is different or preferably identical and chosen from numbers in the range from zero to 50, preferably 2 to 20 and particularly preferably 3 to 15.

Preference is given to compounds of the formula V a

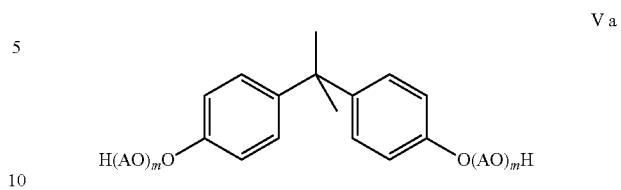

V a

Printing pastes according to the invention can comprise one or more emulsifiers. Suitable emulsifiers are preferably nonionic. Examples of nonionic emulsifiers are, for example, mono- or polyalkoxylated, preferably propoxylated and in particular poly-, e.g. 3 to 100-fold ethoxylated fatty alcohols, oxo alcohols and in particular aryl polyglycol ethers, for example of the formula VI a to VI c:

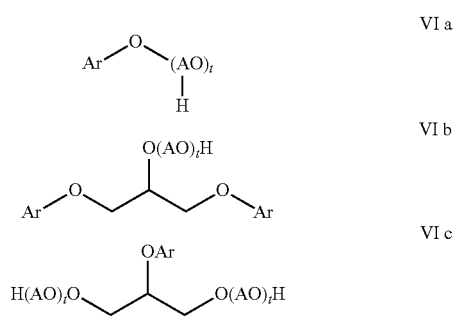

VI a

VI b

VI c

Here, the variables are defined as follows:

Ar: different or optionally identical, $C_6$-$C_{14}$-aryl, for example phenyl, naphthyl or phenanthryl, unsubstituted or mono- or polysubstituted, in particular with $C_1$-$C_4$-alkyl, branched or unbranched, for example methyl, ethyl, n-propyl, isopropyl, n-butyl, isobutyl, or with alkylaryl, for example styryl; preferred substituted phenyl radicals are in each case substituted in the 2,6 position or in the 2,4,6 position with $C_1$-$C_4$-alkyl.

t is different or preferably identical and chosen from the numbers in the range from 1 to 100, preferably 2 to 50 and particularly preferably 3 to 20.

In one embodiment of the present invention, aqueous microcapsule formulations according to the invention, in particular printing pastes according to the invention, comprise 0.01 to 45% by weight, preferably 0.11 to 30% by weight, particularly preferably 0.5 to 20% by weight, of microcapsules according to the invention.

In one specific embodiment of the present invention, printing pastes according to the invention-comprise 0.01 to 45% by weight, preferably 0.11 to 30% by weight, particularly preferably 0.5 to 20% by weight, of microcapsules according to the invention, up to 10% by weight, preferably 0.001 to 8% by weight of thickeners, 1 to 30% by weight, preferably 2 to 20% by weight, of binders and in total 0.1 to 6% by weight, preferably 0.5 to 3% by weight, of further additives, where data in % by weight are based in each case on the total printing paste according to the invention. The remainder is preferably water.

In one embodiment of the present invention, aqueous microcapsule formulations according to the invention, in particular printing pastes according to the invention, have a solids content in the range from 3 to 50% by weight, preferably from 5 to 40% by weight.

In one embodiment of the present invention, aqueous microcapsule formulations according to the invention, in particular printing pastes according to the invention, have a pH in the range from 7 to 11, preferably up to 9.

Printing pastes according to the invention are suitable for the printing of a wide variety of substrates, for example wood, paper, polymer films, for example made of polyethylene or polyester, and also leather, artificial leather, paperboard and cardboard and in particular textile.

In one preferred embodiment of the present invention, the printing pastes according to the invention are printing pastes for the printing of textiles. The term textile is defined above. Preferably, within the context of the present invention, the textile is a textile with an areal structure, also called areal textile above.

If printing pastes according to the invention are used for printing substrates, in particular textiles, then speckle-free printed substrates are obtained with superb hand and good fastnesses, for example rubbing fastness.

The present invention further provides combinations of a plurality of, for example at least two, printing pastes according to the invention, which each preferably comprise one type of microcapsules according to the invention with a different colored or color-imparting substance (C). Using combinations of printing pastes according to the invention it is possible, for example, to produce multicolored prints.

The present invention further provides a method for treating substrates, in particular textile, using at least one aqueous microcapsule formulation according to the invention, also referred to below as treatment method. Details for carrying out embodiments of the treatment method according to the invention are given above.

A further subject matter is a method of printing substrates, in particular textile, using at least one printing paste according to the invention. The method according to the invention for printing substrates is also termed printing method according to the invention in the text below.

For the purpose of printing, methods known per se are used, for example a screenprinting process.

One embodiment of the printing method according to the invention is described below.

The printing method according to the invention starts from substrate which may be un-pretreated or pretreated by methods known per se. For example, substrates made of cotton can be pretreated, in particular bleached.

This is followed by printing with printing paste according to the invention, for example, using a squeegee. Printing can be uniform or substrate can be printed with one or more patterns. Printing is preferably uniform.

In one embodiment of the present invention, the actual printing of substrate with printing paste according to the invention is followed by a thermal treatment, in one or more treatment steps. It is possible, for example, to dry thermally and/or fix thermally, preference being given to drying at temperatures of from 70 to 120° C. over a period of from 30 seconds to 30 minutes and/or fixing, if appropriate, following drying, at temperatures of from 140° C. to 200° C. over a period of from 30 seconds to 15 minutes. Duration and temperature of the thermal treatment are in each case adapted to the substrate to be printed. The temperatures specified above are in each case the temperatures of the heating medium, for example, of the circulating air flow.

The thermal treatment may be followed by washing or ironing.

This gives printed substrates which have good thermoregulating properties, a pleasant hand and good fastnesses, such as, for example, rubbing fastnesses, and which are likewise subject matter of the present invention. Preferably, printed substrates according to the invention are printed textile. For example, textiles according to the invention are exceptionally useful in the clothing sector and as flags or pennants, and also as decorative materials in the home textile sector or in the field of industrial textiles.

The present invention further provides a method of producing aqueous microcapsule formulations according to the invention, in particular printing pastes according to the invention, within the context of the present invention also referred to as production method according to the invention. The production method according to the invention takes place by mixing, in particular stirring of microcapsules according to the invention, at least one binder, if appropriate, with thickeners and if appropriate with at least one additive, and, if appropriate, topping up with water.

The order in which the aforementioned constituents of printing pastes according to the invention are added can be freely chosen. When it is desired to use one or more thickeners, it is preferable to add the thickener or thickeners last or immediately before topping up with water.

The production method according to the invention can be carried out in any desired vessels, for example in stirred vessels.

When it is desired to use one or more thickeners, it is preferable to mix by means of a high-speed stirrer, for example an Ultra-Thurrax.

The invention is explained by working examples.

General preliminary remark: all data in %, are % by weight, unless expressly stated otherwise.

I Preparation of Microcapsules According to the Invention

I.1 Preparation of Microcapsules According to the Invention MC.1

A water phase and an oil phase are prepared.

Water Phase:

381 g of water 190 g of a 5% by weight aqueous solution of methylhydroxypropylcellulose (commercially available as Culminal® MHPC 100)

47.5 g of a 10% by weight aqueous polyvinyl alcohol solution (degree of hydrolysis: 79 mol %), commercially available as Mowiol® 15-79

2.1 g of a 2.5% strength by weight aqueous sodium nitrite solution

Oil Phase 431 g of n-octadecane (A.1)

9 g of a technical-grade paraffin with melting point of 65° C. (A.2)

19.6 g of methyl methacrylate (monomer I.1)

19.6 g of 1,4-butanediol acrylate (monomer II.1)

9.8 g of methacrylic acid (monomer I.2)

4.4 g of oil-soluble dye of the formula I.1

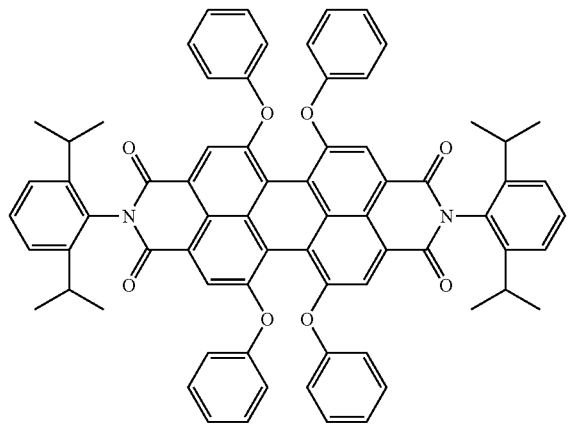

I.1

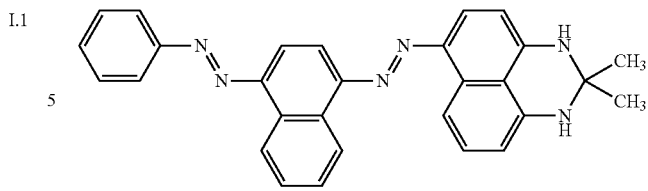

0.7 g of 75% solution of tert-butyl perpivalate in aliphatic hydrocarbons

Feed 1.1:

5.38 g of a 10% by weight aqueous tert-butyl hydroperoxide solution

Feed 1.2:

28.3 g of a 1% by weight aqueous ascorbic acid solution

The above water phase was initially introduced at room temperature. Following the addition of the oil phase, the mixture was dispersed using a dissolver stirrer at 3500 rpm (revolutions per minute). Following dispersion for 40 minutes, a stable emulsion with a droplet diameter in the range from 2 to 12 μm was obtained. The resulting emulsion was heated with stirring using an anchor stirrer over the course of 60 minutes at 70° C., and over the course of a further 60 minutes at 85° C. and stirred for one hour at 85° C. A microcapsule dispersion formed. Feed 1.1 was added to the resulting microcapsule dispersion over the course of 5 minutes with stirring. Then, Feed 1.2 was metered in over a period of 90 minutes with stirring, while cooling to room temperature. The mixture was then neutralized with aqueous NaOH solution. The resulting dispersion of microcapsules MC.1 according to the invention had a solids content of 43.9% and an average particle diameter of 5.1 μm (measured using Fraunhofer diffraction, volume average).

I.2 Preparation of Microcapsules MC.2 According to the Invention

A water phase and an oil phase are prepared.

Water Phase:

381 g of water 190 g of a 5% by weight aqueous solution of methylhydroxypropylcellulose (commercially available as Culminal® MHPC 100)

47.5 g of a 10% by weight aqueous polyvinyl alcohol solution (degree of hydrolysis: 79 mol %), commercially available as Mowiol® 15-79

2.1 g of a 2.5% by weight aqueous sodium nitrite solution

Oil Phase 431 g of n-octadecane (A.1)

9 g of a technical-grade paraffin with a melting point of 65° C. (A.2)

19.6 g of methyl methacrylate (monomer I.1)

19.6 g of 1,4-butanediol acrylate (monomer II.1)

9.8 g of methacrylic acid (monomer I.2)

4.4 g of the oil-soluble black dye (C.2)

0.7 g of a 75% by weight solution of tert-butyl perpivalate in aliphatic hydrocarbons Feed 2.1:

5.38 g of a 10% by weight of aqueous t-butyl hydroperoxide solution

Feed 2.2:

28.3 g of a 1% by weight aqueous ascorbic acid solution.

The above water phase was initially introduced at room temperature. Following the addition of the oil phase, the mixture was dispersed using a dissolver stirrer at 3500 rpm. Following dispersion for 40 minutes, a stable emulsion with a droplet diameter in the range from 2 to 12 μm was obtained. The resulting emulsion was heated with stirring using an anchor stirrer over the course of 60 minutes at 70° C., and over the course of a further 60 minutes at 85° C., and stirred for one hour at 85° C. A microcapsule dispersion was formed. Feed 2.1 was added to the resulting microcapsule dispersion with stirring over the course of 5 minutes. Feed 2.2 was metered in with stirring over a period of 90 minutes, while cooling to room temperature. The mixture was then neutralized with aqueous NaOH solution. The resulting dispersion of microcapsules had a solids content of 43.4% and an average particle size of 3.6 μm (measured using Fraunhofer diffraction, volume average).

II. Preparation of a Printing Paste

The following additives and binders were used:

(Additive 1) Copolymer of acrylic acid (92% by weight), acrylamide (7.6% by weight), methylenebisacrylamide (0.4% by weight), quantitatively neutralized with ammonia (25% by weight in water), molecular weight $M_w$ of about 150 000 g/mol

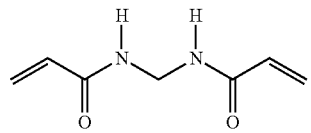

(Additive 2):

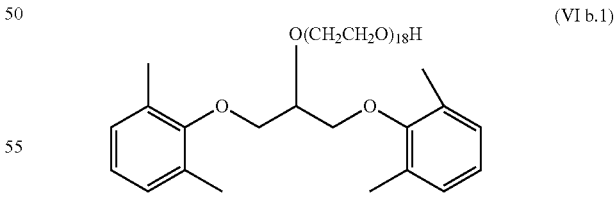

(VI b.1)

(Additive 3): $C_{14}$-$C_{18}$-fatty acid alkoxylate

Binder 1: Copolymer dispersion, pH 6.8, solids content 40%, of a random emulsion copolymer of 1 part by weight of N-methylolacrylamide, 1 part by weight of acrylic acid, 4 parts by weight of acrylamide, 26 parts by weight of styrene, 68 parts by weight of n-butyl acrylate, data in parts by weight are in the case of the binders in each case based on the total solid, average particle diameter (weight-average) 172 nm, determined by Coulter counter.

The following ingredients were stirred in a stirred vessel.
500 g of binder 1 (telle quelle),
20 g of emulsion of 25% by weight Additive 1 in water/white oil (40:60 volume %),
2 g of Additive 2,
1 g of Additive 3, and
400 g of dispersion of microcapsules MC.1 according to the invention, or
400 g of dispersion of microcapsules MC.2 according to the invention as in Example I.

The mixture was made up to one liter with water and then stirred for 15 minutes using a high-speed stirrer of the Ultra-Turrax type at approximately 2000 revolutions/min. This gave smooth-looking, tacky, agglomerate-free printing pastes.

Printing Substrate:
Cotton fabric, bleached, not mercerized, base weight 196 g/m$^2$ ("BW").

Printing: squeegee 8 mm, magnet pull level 6, template gauze E 55

Thermal treatment: 2 steps, 1st step: drying: at 90° C. over 10 minutes in the drying cabinet.

The subsequent 2nd step of the thermal treatment (crosslinking) was carried out in each case on a stretcher using hot air by heating for five minutes at 150° C.

This gave a brilliantly colored or black textile which combined excellent heat storage capacity with excellent fastnesses (rubbing fastness, washing fastness).

The invention claimed is:

1. A microcapsule comprising:
    (A) in a range from 50 to 95 parts by weight, lipophilic core material which has a solid/liquid phase transition in a temperature range from −20 to 120° C.;
    (B) in a range from 4 to 50 parts by weight, capsule wall; and
    (C) in a range from 0.01 to 10 parts by weight, at least one colored or color-imparting substance selected from the group consisting of an oil-soluble dye and an oil-soluble brightener,
    wherein data in parts by weight are based on total weight of the microcapsule in question, and wherein
    the capsule wall (B) is a (co)polymer comprising, in reacted form:
    30 to 100% by weight of at least one monomer (monomer I), selected from the group consisting of acrylic acid, methacrylic acid, maleic acid, and a $C_1$-$C_{24}$-alkyl ester of (meth)acrylic acid;
    0 to 70% by weight at least one bi- or polyfunctional monomer (monomer II), which is or are insoluble or sparingly soluble in water; and
    0 to 40% by weight at least one other monomer (monomer III) which is at least one monomer selected from the group consisting of vinyl acetate, vinyl propionate, vinylpyridine, styrene, α-methylstyrene, itaconic acid, 2-hydroxyethyl acrylate, methacrylate, acrylamido-2-methylpropanesulfonic acid, methacrylamide, N-vinylpyrrolidone, N-methylolacrylamide, N-methylolmethacrylamide, N,N-dimethyl-aminoethyl methacrylate and diethylaminoethyl methacrylate,
    wherein data in % by weight are based on total weight of the capsule wall (B).

2. The microcapsule according to claim 1, having an average diameter in a range from 0.5 to 100 μm (number-average), determined by light scattering.

3. The microcapsule according to claim 1, wherein the capsule wall (B) is a copolymer, comprising, in reacted form:
    30 to 90% by weight of at least one monomer I;
    10 to 70% by weight of at least one monomer II; and
    0 to 30% by weight of at least one monomer III.

4. The microcapsule according to claim 1, wherein monomer II is selected from a mixture of divinyl and polyvinyl monomers, wherein the fraction of the polyvinyl monomers is 2 to 90% by weight, based on the monomers in monomer II.

5. The microcapsule according to claim 1, wherein the capsule wall (B) comprises, in reacted form:
    at least two different monomers I;
    optionally, at least one monomer; and
    optionally, at least one monomer III.

6. The method of producing the microcapsules according to claim 1, comprising polymerizing the monomers I, II, and III in the presence of at least one protective colloid.

7. A method of finishing areal substrates-the method comprising coating, impregnating, spraying, printing, or slop-padding an areal substrate with at least one microcapsule according to claim 1, or incorporating at least one microcapsule according to claim 1 into fibers of the areal substrate.

8. An areal substrate finished with microcapsules according to claim 1.

9. The substrate according to claim 8, wherein it is selected from fibrous substrates and building materials.

10. A method of producing a microcapsule according to claim 1, which comprises (co)polymerizing, in the presence of
    (A) in a range from 50 to 95 parts by weight, lipophilic core material which has a solid/liquid phase transition in a temperature range from −20 to 120° C., and
    (C) in a range from 0.01 to 10 parts by weight, at least one colored or color-imparting substance selected from the group consisting of an oil-soluble dye and oil-soluble brightener,
    in a range from 4 to 50 parts by weight of a monomer or a mixture of monomers:
    30 to 100% by weight of at least one monomer (monomer I), selected from the group consisting of acrylic acid, methacrylic acid, maleic acid, and a $C_1$-$C_{24}$-alkyl ester of (meth)acrylic acid;
    0 to 70% by weight of at least one bi- or polyfunctional monomer (monomer II), which is or are insoluble or sparingly soluble in water; and
    0 to 40% by weight of at least one other monomer (monomer III),
    wherein data in % by weight are based on total weight of the monomers I, II, and III,
    and data in parts by weight are based on a total weight of finished microcapsules.

11. The method according to claim 10, wherein a (co)polymerization temperature is above a temperature at which lipophilic core material (A) has its solid/liquid phase transition.

12. An aqueous formulation comprising microcapsules according to claim 1.

13. The aqueous formulation according to claim 12, further comprising at least one binder.

* * * * *